United States Patent
Shambat et al.

(10) Patent No.: US 9,588,254 B2
(45) Date of Patent: Mar. 7, 2017

(54) OPTICAL FIBERS FUNCTIONALIZED WITH PHOTONIC CRYSTAL RESONANT OPTICAL STRUCTURES

(71) Applicant: The Board of Trustees of the Leland Stanford Junior University, Palo Alto, CA (US)

(72) Inventors: Gary Shambat, San Francisco, CA (US); Jelena Vuckovic, Palo Alto, CA (US)

(73) Assignee: The Board of Trustees of the Leland Stanford Junior University, Plalo Alto, CA (US)

( * ) Notice: Subject to any disclaimer, the term of this patent is extended or adjusted under 35 U.S.C. 154(b) by 0 days.

(21) Appl. No.: 14/755,988

(22) Filed: Jun. 30, 2015

(65) Prior Publication Data
US 2015/0378054 A1    Dec. 31, 2015

Related U.S. Application Data (62) Division of application No. 13/569,567, filed on Aug. 8, 2012, now abandoned.

(60) Provisional application No. 61/574,750, filed on Aug. 8, 2011.

(51) Int. Cl.
| | | |
|---|---|---|
| G02B 1/00 | (2006.01) | |
| G02B 6/26 | (2006.01) | |
| B82Y 20/00 | (2011.01) | |
| G02B 6/122 | (2006.01) | |
| G02B 6/30 | (2006.01) | |

(52) U.S. Cl.
CPC .............. *G02B 1/005* (2013.01); *B82Y 20/00* (2013.01); *G02B 6/1225* (2013.01); *G02B 6/262* (2013.01); *G02B 6/30* (2013.01); *Y10T 156/10* (2015.01)

(58) Field of Classification Search
None
See application file for complete search history.

(56) References Cited

U.S. PATENT DOCUMENTS

| | | | | |
|---|---|---|---|---|
| 4,682,500 A | * | 7/1987 | Uda | ..................... G02B 26/001 250/231.19 |
| 2002/0003917 A1 | * | 1/2002 | Sherrer | .................. G01L 23/16 385/12 |

(Continued)

OTHER PUBLICATIONS

NKT Photonics, Fiber Handling, Stripping, Cleaving and Coupling, Aug. 2009.*

*Primary Examiner* — Ryan Lepisto
*Assistant Examiner* — Erin Chiem
(74) *Attorney, Agent, or Firm* — Lumen Patent Firm (57) ABSTRACT

A photonic crystal (PC) device including one or more resonant optical structures defined by the photonic crystal structure is affixed to the end face of an optical fiber. The PC device is fabricated on a separate substrate, and then affixed to the fiber end face. This transfer can be facilitated by device templates which are laterally supported by tabs after an undercut etch. The tabs can be designed to break during transfer to the fiber, thereby facilitating transfer. Registration marks and/or the use of device templates having the same diameter as the fiber can be used to provide lateral alignment of the fiber to the resonant optical structures. Such alignment may be needed to provide optical coupling between the fiber and the resonant optical structures.

5 Claims, 12 Drawing Sheets

(56) References Cited

U.S. PATENT DOCUMENTS

2006/0133715 A1* 6/2006 Belleville ............. G01L 9/0079
385/13
2008/0226217 A1* 9/2008 Kilic ...................... G02B 6/264
385/12

* cited by examiner

OPTICAL FIBERS FUNCTIONALIZED WITH PHOTONIC CRYSTAL RESONANT OPTICAL STRUCTURES

CROSS REFERENCE TO RELATED APPLICATIONS

This application claims the benefit of U.S. provisional patent application 61/574,750, filed on Aug. 8, 2011, entitled "Optical Fibers Functionalized with Photonic Crystal Cavities", and hereby incorporated by reference in its entirety.

FIELD OF THE INVENTION

This invention relates to fiber-coupled photonic crystal devices.

BACKGROUND

A photonic crystal (PC) has a periodic array of features (e.g., holes) in a background medium. Various devices can be fabricated by modifying the basic structure of a photonic crystal. For example, a PC cavity can be formed by a small cluster of missing holes in a PC lattice (effectively forming a point defect in the PC). As another example, a PC waveguide can be formed by a line of missing holes in a PC lattice.

Photonic crystal devices can readily be fabricated on various semiconducting and/or dielectric substrates. However, it is often difficult to efficiently couple to the resulting PC devices. For example, PC devices fabricated in semiconducting materials typically have small optical mode sizes that can be difficult to efficiently couple to convenient structures, such as optical fibers.

Accordingly, it would be an advance in the art to provide improved fiber coupling of PC devices.

SUMMARY

In the present work, a photonic crystal device including one or more resonant optical structures (e.g., cavities, waveguides, etc.) defined by the photonic crystal structure is affixed to the end face of an optical fiber. The PC device is fabricated on a separate substrate, and then affixed to the fiber end face. This transfer can be facilitated by device templates which are laterally supported by tabs after an undercut etch. The tabs can be designed to break during transfer to the fiber, thereby facilitating transfer. Registration marks and/or the use of device templates having the same diameter as the fiber can be used to provide lateral alignment of the fiber core to the resonant optical structures. Such alignment may be needed to provide optical coupling between the fiber and the resonant optical structures. Alternatively, the resonant optical structures at the fiber end face need not be aligned with the core. For example, an optical cavity can couple to a fiber mode via the fiber cladding or a coupling microstructure in the fiber, such as a grating.

To better appreciate the present invention, it is helpful to consider some problems solved by the above approach in greater detail. Most importantly, we have demonstrated a transfer process that preserves a high quality factor for resonant optical structures defined by a photonic crystal structure. Preserving quality factor is often difficult in practice, and seemingly insignificant forces or perturbations on a PC cavity can ruin its performance. A conventional technique for transferring dielectric structures to a fiber tip relies on micromanipulation assembly inside a focused ion beam chamber. Not only is this process slow and cumbersome, but we found that it completely destroys the properties of sensitive PC cavities. The present adhesive transfer method is an effective way to create fiber coupled cavity devices without spoiling their sensitive electromagnetic properties. Furthermore, the present approach provides a way to align PC cavities (and similar PC structures including other resonant optical structures) to the core of the optical fiber, which can be non-trivial in practice. For example, the fiber core can be indistinguishable from the rest of the fiber under visual inspection.

It is important to note that prior work (e.g., in US 2011/0097031 and US 2012/0045165) on affixing a simple photonic crystal (i.e., no optical resonator structures are formed in the PC) to a fiber end face does not provide any help with the above-indicated problems. A simple PC is much more resistant to damage from handling than a PC cavity structure, so simple handling approaches (e.g., micromanipulation and exposure to ion beams) can work well for simple PCs and be useless for PC cavities. Similarly, alignment of a simple PC to a fiber core is not critical. It will suffice if the fiber core overlaps with any part of the simple PC, which does not need special measures to achieve.

However, for most applications of these structures, the use of small volume optical resonators is preferable over large area photonic crystal mirrors employed in these prior inventions. For example, small volume optical resonators enable bio-sensing with smaller volumes of material. In lasers, the use of resonators enables operation at lower threshold powers. In single photon sources, the employment of a resonator is critical for coupling of emitted single photons into a well defined mode, thus improving their collection and emission rate. In nonlinear optical devices, the use of smaller optical volume resonators enables reduction of thresholds for non-linear optical processes, enabling optical frequency conversion with smaller input powers. In near field sensing, the strong localization of light inside PC resonators enables monitoring of features at sub-micron level.

The present approach provides techniques for transferring a photonic crystal membrane from its original substrate to the tip of an optical fiber. The surface of an optical fiber can be coated with any number of adhesives including epoxy, glue, resist, or liquid. After this, the photonic crystal membrane can be removed by pressing the fiber tip onto the substrate and then retracting the fiber, carrying away the thin slab. The technique can be applied to any number of photonic or electronic devices including a thin membrane.

This transfer method avoids material contamination. It can be performed in a common laboratory environment free of damaging radiation. The transfer requires only simple adhesives and standard microscope imaging capabilities, combined with an appropriately fabricated semiconductor or dielectric photonic device that can be extracted from a chip. Accurate deposition of adhesive onto the fiber tip (e.g., with a sharp probe) is preferred to prevent disruption of the sensitive photonic crystal cavities. Accurate alignment of the optical fiber core with the cavity devices is also preferred for proper coupling of light in and out of fibers.

The present approach relates to both the concept of photonic crystal (PC) devices bound to optical fiber tips as well as a practical method for their assembly. In contrast to other work which has demonstrated the functionalization of fiber tips with metallic particles or simple dielectric structures, the present approach provides functionalization of optical fibers with sophisticated photonic crystal structures that include resonant optical structures (e.g., cavities).

The present approach provides significant advantages:

A. Fiber integration of PC cavity devices replaces bulky and expensive free-space optics with a cheap and versatile optical fiber. This fiber can then be easily connected to any number of already fiber-coupled devices or linked with more complex fiber optic networks.

B. Ease of fabrication: Other methods to transfer semiconductor slabs to fibers include very complicated micromanipulation inside of a focused ion beam chamber. In contrast, the present approach is rapid, simple, and inexpensive to employ. It also avoids potential material contamination by not exposing materials to high energy electrons or ions.

C. Compatible with all material types: Material-dependent recipes do not need to be developed since this method works similarly for all common semiconductors.

Several variations of the given examples can also be considered:

A. The technique is not limited to any specific photonic crystal cavity design, nor the exact membrane pattern, but applies to all photonic crystal cavity design variations.

B. Other types of adhesives can be used to bond the fiber to the semiconductor.

C. The method of adhesive application does not have to be with an electrical probe but could be done with other tools.

D. The photonic crystal device slab can be fixed between two separate optical fibers and coupled to each.

Applications Include:

A. Optically pumped photonic crystal lasers or light emitting diodes coupled to fibers.

B. Single photon emitters such as quantum dots or nitrogen-vacancy centers coupled to fibers.

C. Biological or chemical refractive index or near-field sensors.

D. Raman or fluorescence spectroscopy collection probe.

E. Near-field point source of illumination device.

F. Fiber-coupled nonlinear optics element.

Further details follow with respect to some of these applications.

Applications in Near-Field Sensing:

PC cavities can be made as small as a fraction of a micron in each dimension which makes them great for near-field sensing and detection. Whereas a typical fiber will be limited by diffraction in its ability to sense features smaller than 5-10 microns in size, PC cavities can strongly localize light in a much tighter space. This means that one can use such devices for monitoring features at the sub-micron level, similar to traditional near-field scanning optical microscopy. These near-field devices are simpler and more durable than conventional near-field probes which are extremely fragile and hard to make (and accordingly very expensive). One can use the fiber plus PC (or fiberPC) device to monitor near-field effects via perturbations in cavity spectral features. These perturbations would allow for the sensing, e.g., of metal-tagged biological samples for cancer detection, as well as differences in the surrounding environment of the fiberPC (such as refractive index).

Applications in Resonant Excitation and Collection:

The strong intensity of light that is concentrated in PC cavities can be used to locally and resonantly enhance the properties of external samples. Pump light sent from within the fiber can be concentrated at a cavity on the fiber tip which can then resonantly excite particles within the cavity near field. This enhancement can be orders of magnitude more efficient than regular pumping schemes due to near-field effects provided by the cavity. The reverse process is also true, where molecules or nanoparticles can emit more strongly back into the fiber due to the presence of nearby cavities. Both of these effects can be achieved simultaneously (by using a cavity with multiple resonances), and can be used to improve sensitivity to weak emitters that are important for biological studies and cancer detection. Additionally, the resonant enhancement combined with the sub-micron size of the cavity can be advantageous in optogenetics studies. Normally fibers excite large groups of neurons because of diffraction, but here the fiberPC has the size resolution necessary to discriminate and probe single cells.

Applications in Devices for Fiber Optic Communications and Fiber-Coupled Lab Components:

PC cavities coupled to fibers can find uses in traditional long-haul fiber optic communications. Depending on the application, photonic crystal cavities can be made into lasers, switches, modulators, and filters. All of these are necessary components in fiber optic communications and are normally made from monolithic chip packages which requires expensive coupling and alignment. Incorporating these components at the tip of a fiber (or even sandwiched between two fibers for an in-line package) could provide drastic improvements in cost and simplicity.

The fiberPC architecture could also be used in proposed quantum communication systems in the future which use single or entangled photons. A great deal of work has revolved around quantum emitters embedded in PC cavities but so far these experiments are limited to laboratory based testing. Having the quantum emitters directly bound to fiber facets as in the present approach could provide improved practicality of these communications systems.

Finally, common optics lab components can be simplified and miniaturized with photonic crystal cavities. One example is a cavity-based non-linear frequency converter which could replace conventional non-linear crystals with the advantage of efficient fiber coupling compared to free space optics.

BRIEF DESCRIPTION OF THE DRAWINGS

FIGS. 6a-c show top views corresponding to the side views of FIGS. 5a-c.

DETAILED DESCRIPTION

In this description, section A provides a description of principles relating to various embodiments of the invention, and section B describes some experimental results.

A) Principles

Figure 1A:
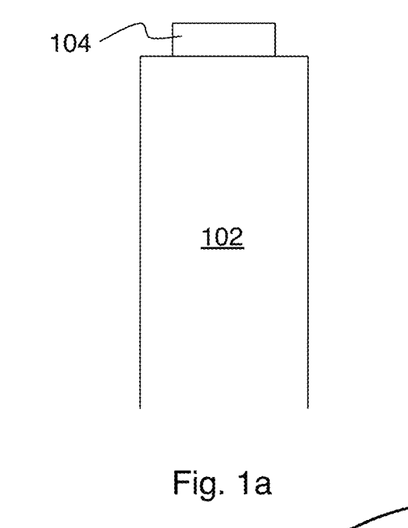
FIGS. 1a-c show some embodiments of the invention.
Figure 1B:
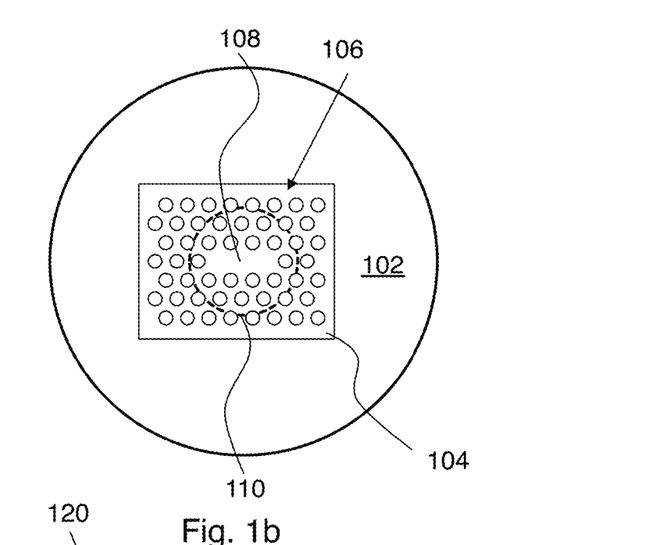
Figure 1C:
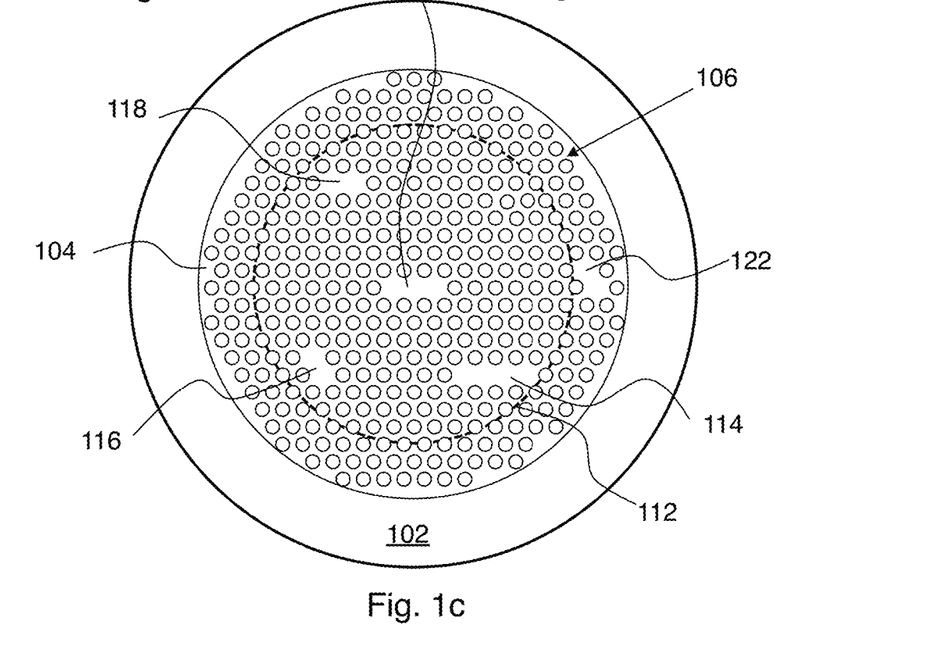

FIGS. 1a-c show some embodiments of the invention. FIG. 1a shows a side view and FIG. 1b shows a corresponding top view. Here a device 104 is affixed to an exposed end face of optical fiber 102. Device 104 includes at least one resonant optical structure (e.g., cavity 108) defined by a photonic crystal structure 106 in a semiconducting or dielectric material. Fiber 102 is optically coupled to cavity 108 (e.g., by providing a spatial overlap of the fiber core 110 and cavity 108). As described in detail below, device 104 is fabricated on a substrate distinct from fiber 102, and then transferred to fiber 102. FIG. 1c shows a variant. Here fiber core 112 overlaps with several cavities (114, 116, 118, 120), and cavity 122 does not overlap with the core. Instead, cavity 122 is aligned with the cladding of fiber 102.

Practice of the invention does not depend critically on the type of fiber employed. Any kind of fiber can be used, including but not limited to: single-mode fiber, multi-mode fiber, photonic crystal fiber, and tapered fiber. The material in which the photonic crystal is fabricated is also not critical. Suitable PC materials include, but are not limited to: silicon, gallium arsenide, indium phosphide, diamond and silicon carbide. Ternary or quaternary IV-IV, III-V or II-VI alloys can also be employed (e.g., InAsP, GaInP, InGaAsP, etc.)

Figure 2A:
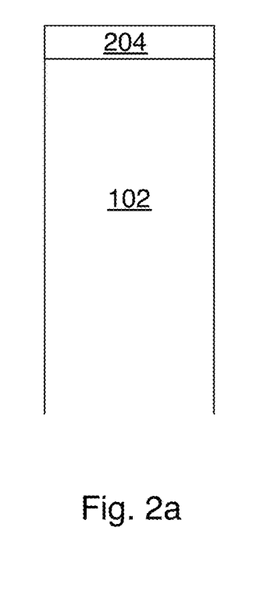
FIGS. 2a-c show further embodiments of the invention.
Figure 2B:
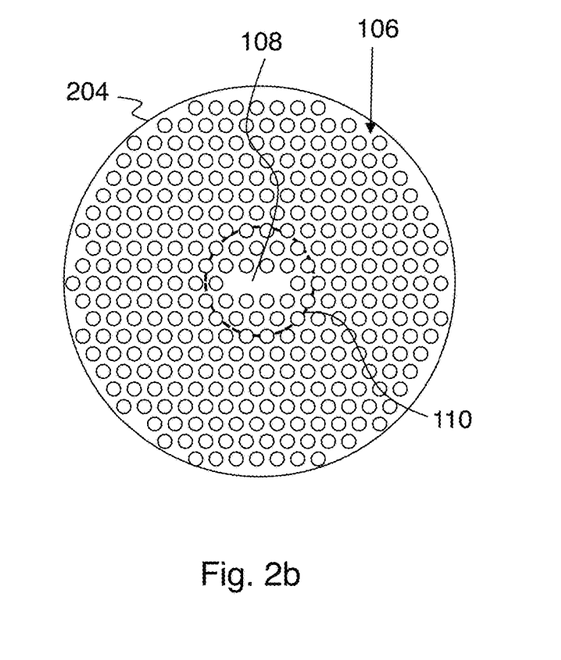
Figure 2C:
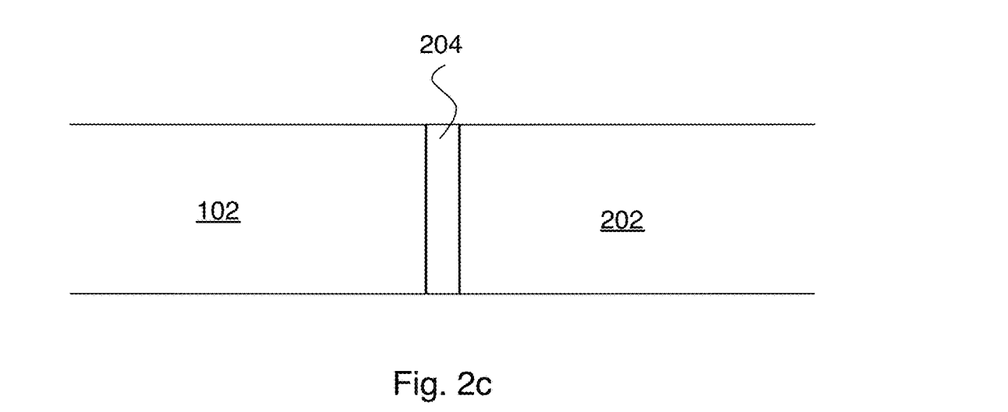
Figure 3:
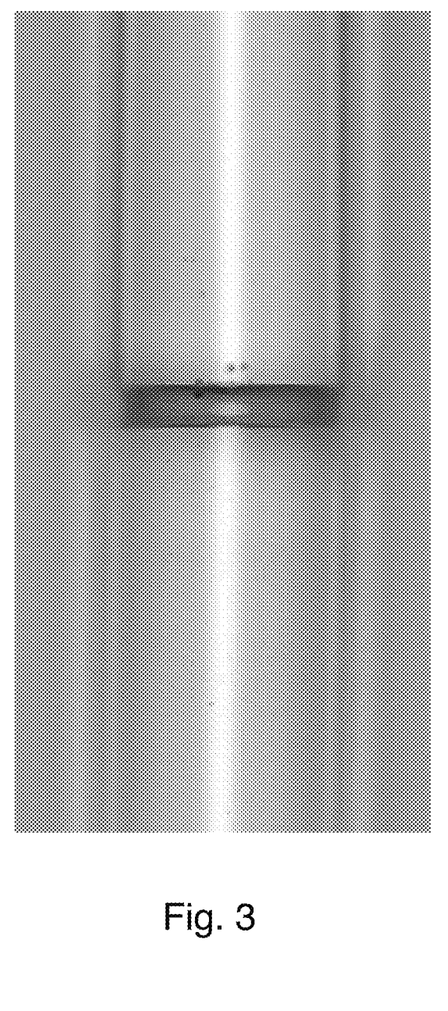
FIG. 3 shows an exemplary image of the embodiment of FIG. 2c.

In general, the PC device affixed to the fiber end face can have any shape and size relative to the fiber end face. In the examples of FIGS. 1b and 1c, rectangular and circular shapes are shown, both smaller than the fiber end face. FIGS. 2a-c show further embodiments of the invention, where device 204 is a PC device having a circular shape and the same diameter as the fiber. This configuration can provide various advantages, such as ample room for epoxy bonding in regions far away from the fiber core and resonant optical structures. Another possibility for this approach is to sandwich PC device 204 between end faces of two fibers 102 and 202, as shown on FIG. 2c and FIG. 3. This capability of providing a PC device in an in-line fiber configuration can have various applications, such as nonlinear devices, efficient single-photon sources, optically pumped photonic crystal lasers, and filters and beam shaping.

Figure 4:
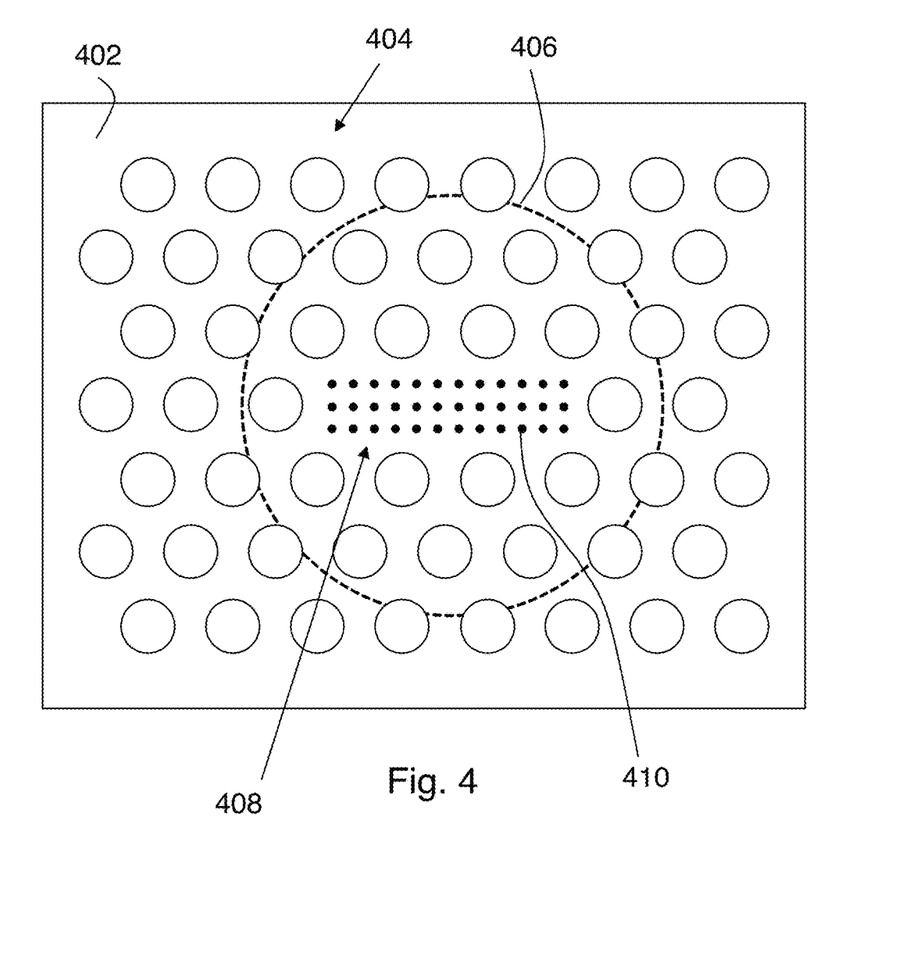
FIG. 4 shows an example of including active structures in a photonic crystal cavity.

Active device elements can be included in the PC device in order to further create, control and/or modify its optical properties. FIG. 4 shows an example, where PC device 402 has a cavity 408 defined by a photonic crystal 404. Cavity 408 includes quantum dots, one of which is referenced as 410. Cavity 408 overlaps with fiber core 406. Any kind of active device element can be used, including but not limited to: P-N junctions, quantum wells, quantum wires, quantum dots, color centers and point defects. Such active device elements can provide various desirable capabilities, such as optical gain, optical emission, optical nonlinearities, and optical detection. Fabrication of active device elements tends to depend significantly on the technology of the photonic crystal material (e.g., GaAs technology is needed to make active device elements in GaAs PC devices, etc.). The ability to form the desired PC structures (+ active device elements) using suitable material technology, followed by transfer of the finished PC devices to the fiber end face provides significant flexibility, and is an important practical advantage.

Figure 5A:
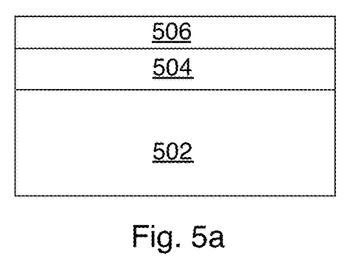
FIGS. 5a-c show side views of an exemplary fabrication sequence.
Figure 5B:
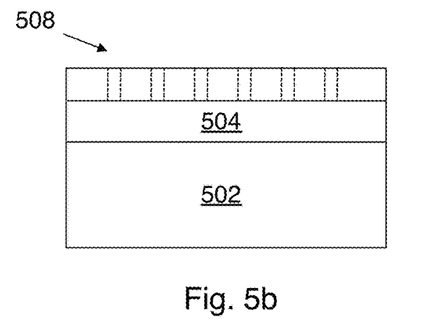
Figure 5C:
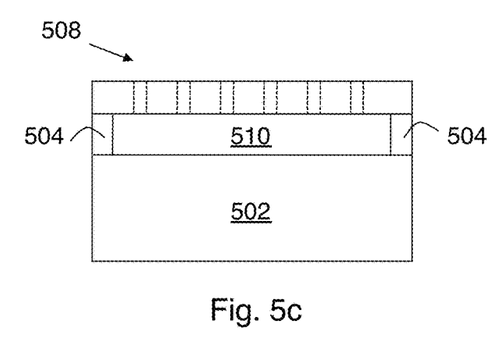
Figure 6A:
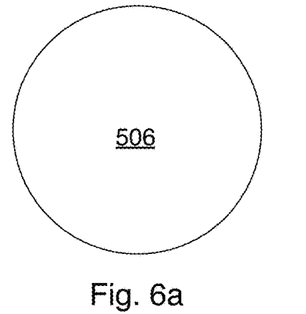
Figure 6B:
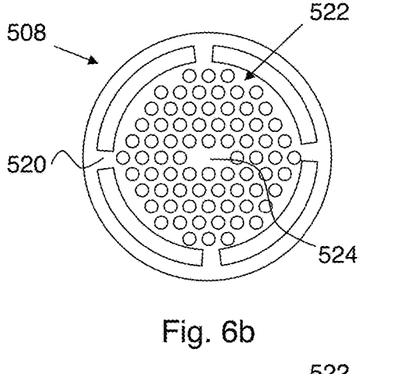

FIGS. 5a-c show side views of an exemplary fabrication sequence. FIGS. 6a-c show top views corresponding to the side views of FIGS. 5a-c. FIG. 5a shows substrate 502, sacrificial layer 504 and device layer 506. The top view of FIG. 6a shows a featureless device layer 506. The next step is fabrication of the PC device template 508 by patterning device layer 506, as shown on FIGS. 5b and 6b. Such patterning can be done by methods which are known in the art for making PC structures. Here cavity 524 is defined by photonic crystal 522, and lateral tabs (one of which is referenced as 520) are defined around the outer edge of the device. The purpose of these tabs is to facilitate transfer to the fiber, as described below.

Figure 7A:
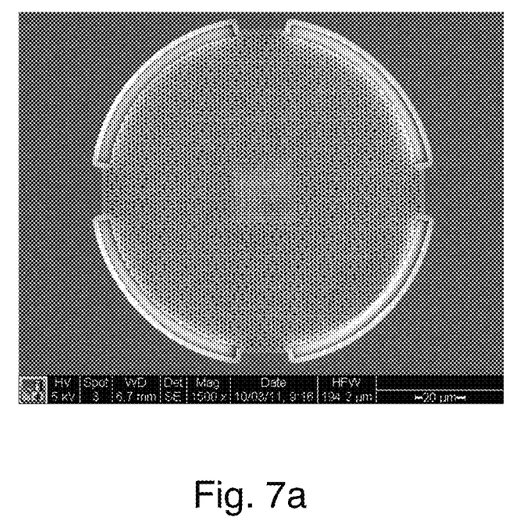
FIGS. 7a-b show images of fabricated photonic crystal templates.
Figure 7B:
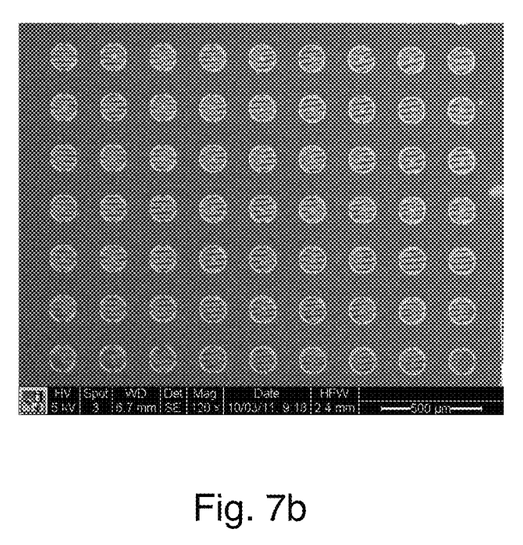

The next step is to perform an undercut etch to mostly remove sacrificial layer 504, thereby opening up a gap 510 separating PC device template 508 from substrate 502. The resulting configuration has PC device template 508 suspended above substrate 502 by the lateral tabs (4 tabs are shown in this example, but in general 2 or more tabs can be used for this). Suitable etching methods are known in the art, depending on the material being used. FIGS. 7a-b show images of fabricated device templates.

Figure 8A:
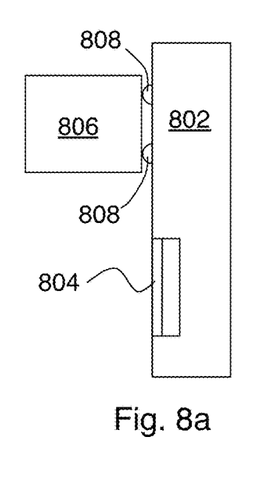
FIGS. 8a-e show further views of an exemplary fabrication sequence.
Figure 8B:
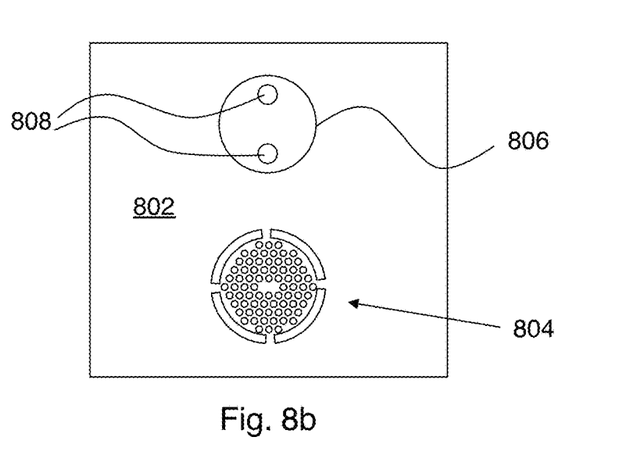
Figure 8C:
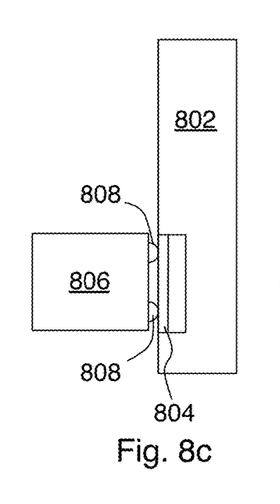
Figure 8D:
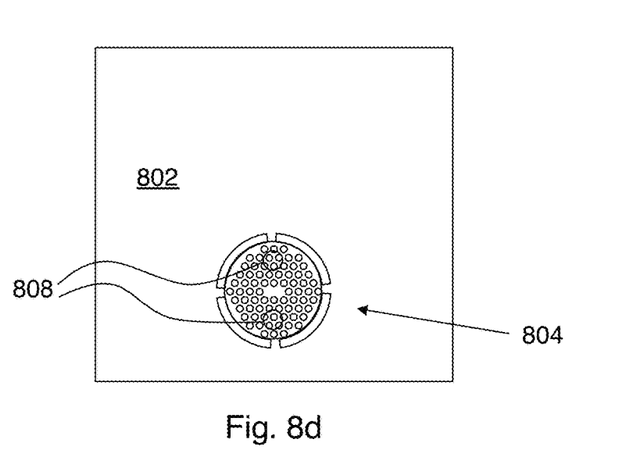
Figure 8E:
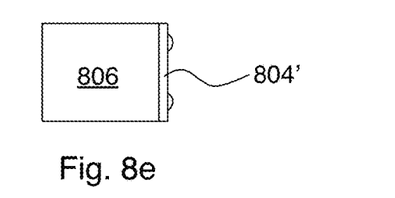

FIGS. 8a-e show further views of an exemplary fabrication sequence relating to transfer from substrate to fiber. Here FIGS. 8a, 8c, and 8e are side views, and FIGS. 8b and 8d are top views corresponding to FIGS. 8a and 8c respectively. In the step shown on FIGS. 8a-b, an uncured adhesive 808 is disposed on a transfer surface 802 in a predetermined pattern. Transfer surface 802 can be an unpatterned part of the layer in which device templates (e.g., 804) are formed, as in this example. This pattern can be precisely deposited on surface 802 (e.g., picoliter quantities of adhesive deposited using a sharp needle). Precise definition of this pattern is preferred, in order to keep adhesive away from the fiber core and/or away from resonant optical structures such as cavities, waveguides etc. in the PC device. Fiber 806 is brought into contact with the adhesive pattern, thereby transferring adhesive to the fiber end face.

FIGS. 8c-d show fiber 806 aligned to device template 804 and making contact with the device template. FIG. 8e shows the result of pulling fiber 806 away from the substrate such that the lateral tabs of the device template break, thereby providing device 804' affixed to the end face of the fiber 806.

The following paragraphs provide further details relating to an exemplary fabrication sequence.

1) Preparing the Semiconductor Templates

Micro fabrication flow as in section B below. Briefly, a small chip of a semiconductor such as gallium arsenide or silicon in the examples described below (although the procedure could be extended to other semiconductors and other materials) is patterned using electron-beam lithography with circular template design, dry etched to transfer the pattern to the substrate, and then undercut to create free standing membranes of the template that are around 220 nm thick.

Optimization of the template size, shape, region of holes, connecting tabs, and undercut methods are all preferred for templates to work properly. Strain on the template can cause it to bend or pop off the substrate. Improper undercutting conditions can cause the template to touch the substrate and undesirably bond to the substrate (from Van der Waals forces). Similarly an outer pattern of large holes (e.g., as shown on FIG. 7a and FIG. 11) surrounding the PC structure is preferred to suspend the full 125 micron diameter structure. The outer pattern of large holes facilitates a complete undercut.

2) Preparing the Optical Fiber

The fiber can be any optical fiber, but in this case it was SMF-28 which has a core diameter of 9 microns. The fiber is stripped and cleaved to yield a flat and clean facet.

3) Device Assembly

Under the view of an optical microscope, the chip is mounted facing up. A prepped optical fiber is mounted with the cleaved facet pointing down towards the chip.

Epoxy is then mixed and a tiny (nanoliter) sized drop is dabbed onto the tip of a sharp electrical probe mounted to a micromanipulator. The micromanipulator is then moved to the optical setup and the glue is allowed to spread onto the surface of the semiconductor chip. The sharp tip is then used to draw two (or more) small picoliter-sized droplets of epoxy on another region of the semiconductor spaced wide enough apart so that the epoxy won't interfere with the cavity after bonding.

The optical fiber which is mounted above is then brought into the field of view of the epoxy droplets using another micromanipulator and pressed down on the two droplets such that epoxy is transferred onto the end face of the optical fiber. Then the fiber is moved overhead the template of interest and aligned due to the circular mating of the facet with the template size. At the appropriate curing time of the epoxy (typically 5-6 minutes), the fiber is pressed down onto the template and retracted, ripping away the semiconductor template which is bound to the fiber both by the epoxy as well as by Van der Waals forces.

Figure 9:
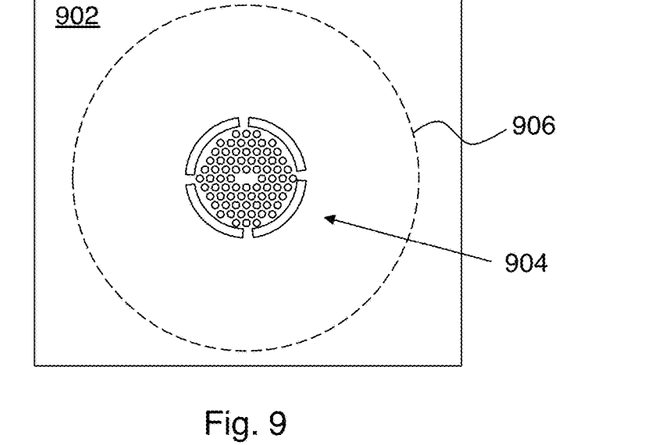
FIG. 9 shows an example of use of registration marks.

As indicated above, the device size can be the same as or different from the fiber diameter. In the example of FIGS. 8a-e, it is apparent that having the device size and fiber diameter be the same can facilitate alignment of the fiber to the PC device template. If the device size and fiber size differ, registration marks can be disposed in a circular pattern around the device, where this circular pattern has the same diameter as the optical fiber. FIG. 9 shows an example, where registration marks 906 surround a device template 904 on a substrate 902. The pattern formed by registration marks 906 is circular and has the same diameter as the optical fiber. Here alignment of the optical fiber to registration marks 906 serves to also align the fiber core to template 904, which would be difficult to do directly.

Figure 10A:
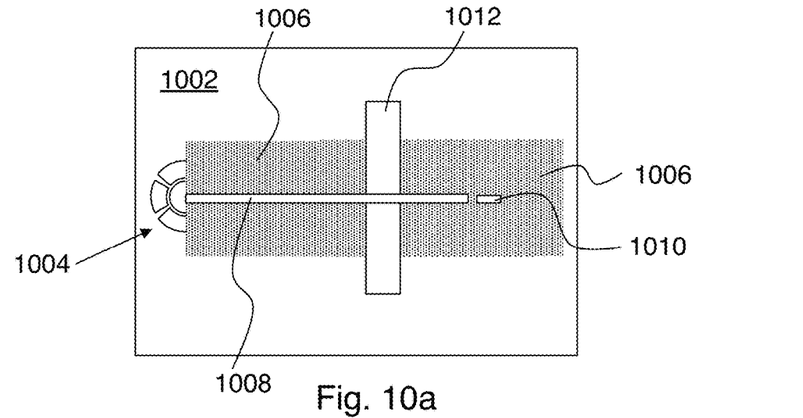
FIGS. 10a-c show an exemplary integrated photonic circuit suitable for use with embodiments of the invention.
Figure 10B:
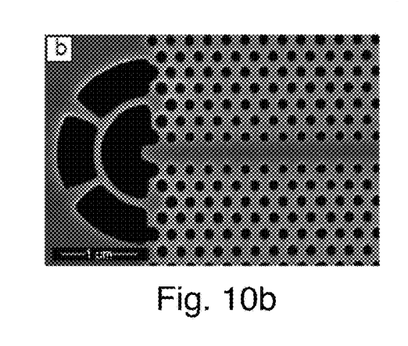
Figure 10C:
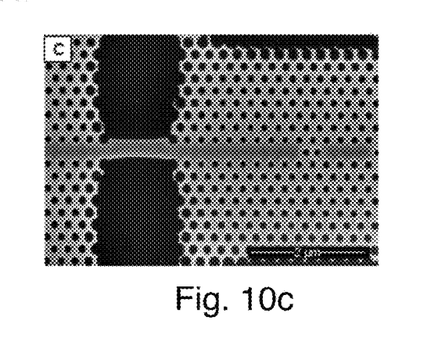

The present approach is suitable for bonding any kind of photonic crystal structure including one or more optical resonant optical structures to an optical fiber. Suitable resonant optical structures include, but are not limited to: optical resonators, optical waveguide and gratings. FIGS. 10a-c show an example of an PC integrated optical circuit that could be bonded to the end face of a fiber. In this example, integrated optical circuit 1002 includes a cavity 1010 coupled to a waveguide 1008 where both waveguide and cavity are defined by photonic crystal 1006. Waveguide 1008 crosses an air gap 1012 and is coupled to a grating 1004. FIG. 10b is an image showing grating 1004 and waveguide 1008 in a fabricated structure. FIG. 10c is an image showing cavity 1010 and waveguide 1008 in a fabricated structure.

B) Experimental Demonstrations

B1) INTRODUCTION

Semiconductor photonic crystal (PC) cavities are microscale optical structures that possess interesting properties based on their ability to strongly localize light. To date, the vast majority of work on photonic crystal cavities has centered on the properties of devices still bound to their original growth substrates. This form factor is convenient for free space optical testing in the laboratory, but is difficult to integrate in larger systems having many devices. Coupling light on- and off-chip is challenging due to severe size mismatch between PC components and external fiber optics. While certain applications of PCs such as dense all-optical processing may still require full on-chip integration, other applications of single or few photonic crystal cavities may benefit dramatically through a change in platform.

In this work, we report on an easy and rapid procedure to transfer PC cavities to fiber tips that avoids complicated micro fabrication processing and uses ordinary epoxy as an adhesive layer. Previous studies have shown the transfer of PC cavities onto rigid or flexible substrates, but, to our knowledge, none have demonstrated functional cavities coupled to the tip of an optical fiber. Our method can be done with a microscope-based setup in under an hour and can require only tens of μm of precision for alignment. Additionally, material-specific recipes are not needed, and many types of active or passive cavities can be incorporated onto fibers. Using this technique, we functionalize optical fiber tips by transferring Si cavities with resonances at 1500 nm as well as GaAs cavities resonant with InAs quantum dots (QDs) emitting at 1300 nm.

B2) FABRICATION

Photonic crystal cavities were fabricated through standard electron-beam lithography, dry etching, and undercutting. Both Si and GaAs air-bridged membranes were 220 nm thick and the GaAs material contained three layers of high density (300 dots/μm$^2$) InAs QDs with emission at 1300 nm. We use the common PC cavity design of a modified L3 defect with shifted air holes for high quality factor (Q) cavities and we use coupled cavity arrays (CCAs) for large mode area coupling. The L3 cavities in Si had a triangular lattice constant a=450 nm and hole radius r=0.22a while the cavities in GaAs had a=330 nm and r=0.22a. For the Si CCAs we use a=490 nm and r=0.38a and a two hole spacing between cavities in a square lattice. To facilitate alignment and guarantee that at least one L3 cavity will spatially overlap the fiber core (approximately 9 μm in diameter for SMF-28), we generate an array of uncoupled cavities spaced by no more than 9 m apart (the cavities themselves are roughly 1 m$^2$ in area). Similarly, we pattern a large 25 μm×25 μm zone for the CCA lattice. A final outer region of 1 μm diameter air holes surrounding the cavities was used to release a larger 125 μm diameter circle for easier transfer.

The first step in the transfer process of this experiment (which differs from the example of FIGS. 8a-e) is to use a sharp electrical probe to apply general purpose epoxy to the outer rim of a cleaved and stripped single-mode communication fiber facet. Epoxy is deposited in small amounts on the cladding surface so as to avoid contamination of the optical fiber core. A micromanipulator stage is used for positioning but we note that the precision required is low since the working fiber facet area is quite large. We next invert our fiber and approach our cavity structures from above. The fiber is centered over the cavities and then lowered until it comes into contact with the semiconductor membrane. Since the epoxy is applied on the cladding edges, it comes into contact with the outer release region of the membrane and does not spoil the central cavities. After the fiber is contacted with the PC cavities it can be withdrawn as the epoxy cures, ripping away the large membrane structure from support tabs.

Figure 11:
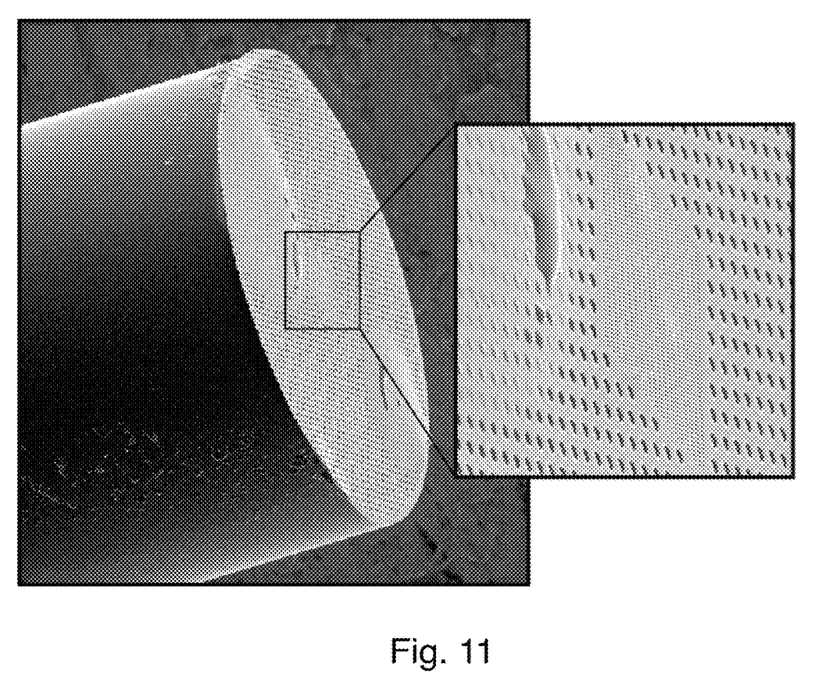
FIG. 11 shows an image of an experimental device according to an embodiment of the invention.

FIG. 11 shows SEM pictures of a completed fiber plus PC cavity, or fiberPC, device for a silicon membrane with 1500 nm cavities. The slab is centered on the fiber facet and is affixed by a minimum amount of epoxy, with a tiny amount protruding from the surface by a few microns. Due to strong Van der Waals forces, we see that the Si membrane is almost perfectly planar to the facet surface. Our fiberPC device is robust and mechanically strong. Preliminary testing in various solution environments shows no material degradation or membrane detachment. In addition, the functionalized fiber tip can be forcefully contacted with various hard surfaces without breaking.

B3) FIBER TAPER TRANSMISSION MEASUREMENT

Figure 12A:
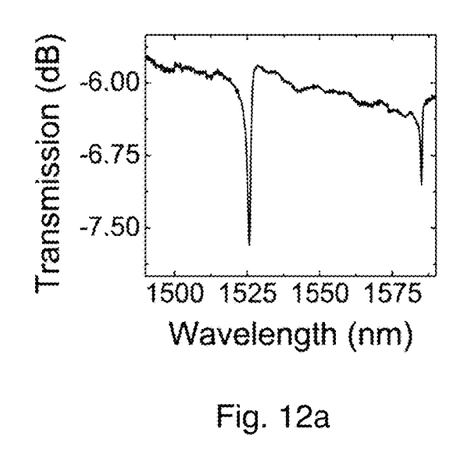
FIGS. 12a-b show experimental results from a fiber taper configuration.
Figure 12B:
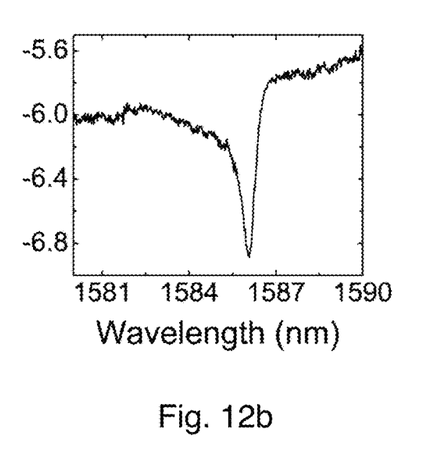

We first investigate the bound cavity properties of our Si L3 device with a fiber taper transmission measurement of a vertically oriented fiberPC. In this experiment, transmission of light from a broadband source through a fiber taper is measured, where the fiber taper is optically coupled to the cavity of a fiberPC. FIG. 12a shows the transmission spectrum when the taper is placed on one of the central cavities of the fiberPC. From a Fano fit of the transmission dip at 1586 nm we find that the fundamental cavity mode loaded Q-factor is 2400 (FIG. 12b). Prior to transfer, these same cavities had measured fiber taper loaded Q-factors of 5000-10000. The decrease in Q-factor after transfer is most likely due to the lossy oxide cladding, as predicted by simulation. Therefore we find from these passive measurements that PC cavities can indeed survive relocation to fiber tips whilst maintaining a high Q. We also note that it is possible to use alternative oxide-clad cavity designs for ultra-high Q applications.

B4) FIBER TO CCA COUPLING

Figure 13A:
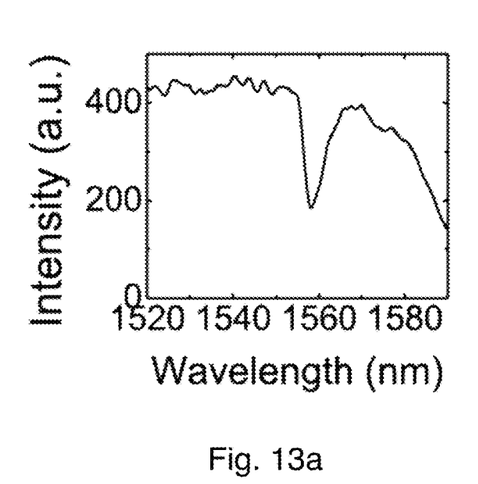
FIGS. 13a-b show experimental results from a coupled cavity array configuration.
Figure 13B:
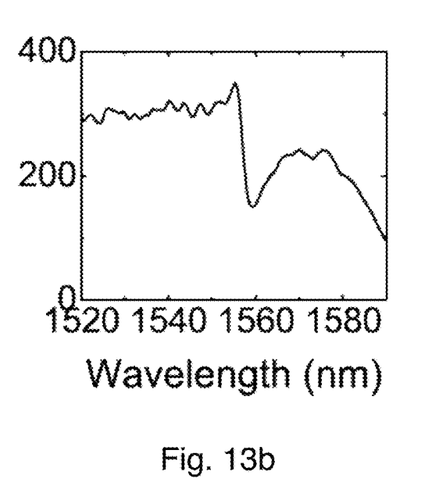

Next, we examine the ability to couple light between the fiber and cavities in a fiberPC using a direct transmission measurement. In this experiment, light from a broadband source is coupled to the fiber of the fiber PC, and transmission through the device affixed to the fiber end face is measured. For this test we use fiberPCs with a Si CCA since the large cavity modes overlap better with the Gaussian TE fiber modes, producing a stronger transmission resonance signal. FIGS. 13a and 13b show two transmission spectra for the fiberPC for different collection points 10 microns apart (taken by adjusting the area of collection with a pinhole). Clear cavity signals are obtained, indicating that it is possible to directly couple cavity resonances to the fiber. As expected, the transmission line shape is sensitive to the position of the pinhole, suggesting cavity radiation pattern dependence on the interference signal.

B5) PHOTOLUMINESCENCE

Free-Space

Figure 14A:
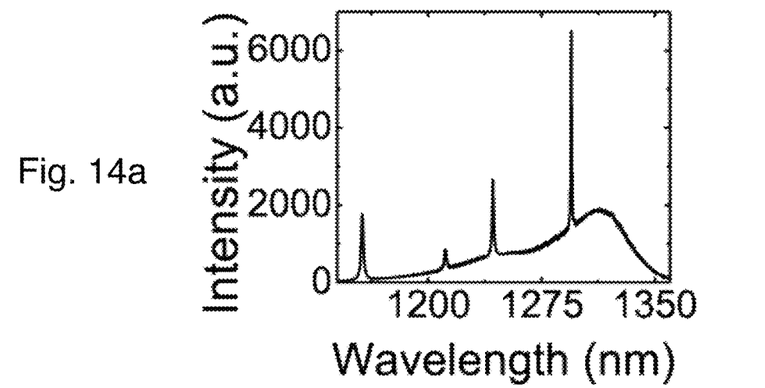
FIGS. 14a-c show free-space photoluminescence (PL) results.
Figure 14B:
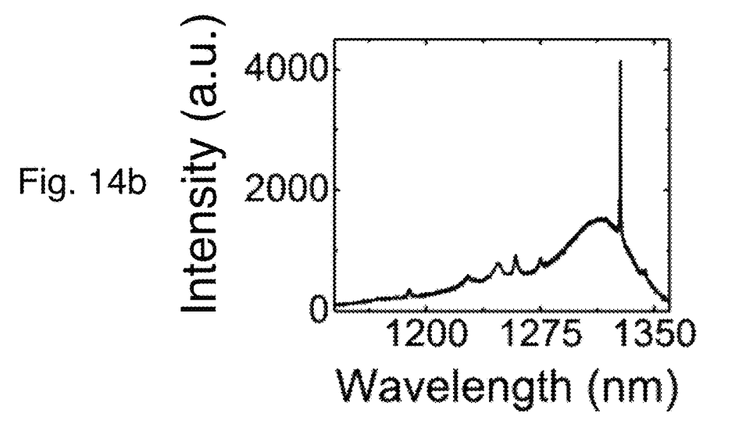
Figure 14C:
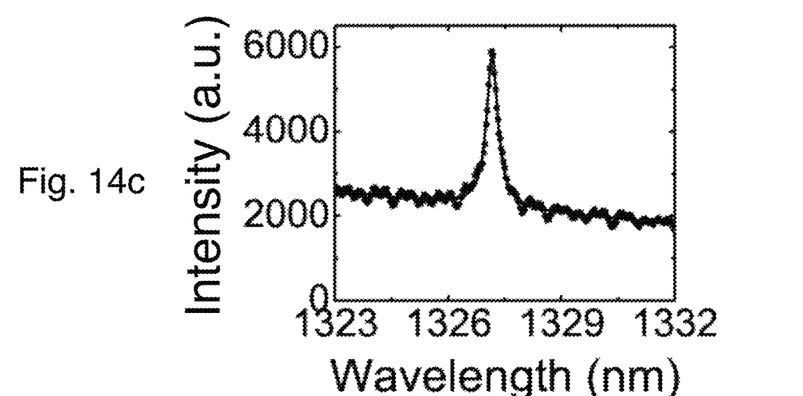

We turn our attention now to active GaAs fiberPCs with light-emitting quantum dots. In this experiment, quantum dots in a PC cavity affixed to a fiber end face are excited by a laser diode coupled to the fiber. PL emission is collected from the fiber end face with free-space optics. FIG. 14a shows the PL spectrum of a single L3 cavity from an uncoupled cavity array before transfer and still on-chip when pumped by tens of μW of 830 nm light from a laser diode (LD). This same membrane was transferred onto a fiber tip and pumped through the fiber with the laser diode. The QD PL is especially bright around the fiber core as well as around nearby cavities. When one of the cavities is spatially filtered with a pinhole from the full structure, we see a PL spectrum in FIG. 14b similar to that prior to transfer. A Lorentzian fit to the cavity mode gives a quality factor of 3700 (FIG. 14c), once again showing that strong resonances can be sustained at a fiber tip.

B6) PHOTOLUMINESCENCE

Fiber-Coupled

Figure 15:
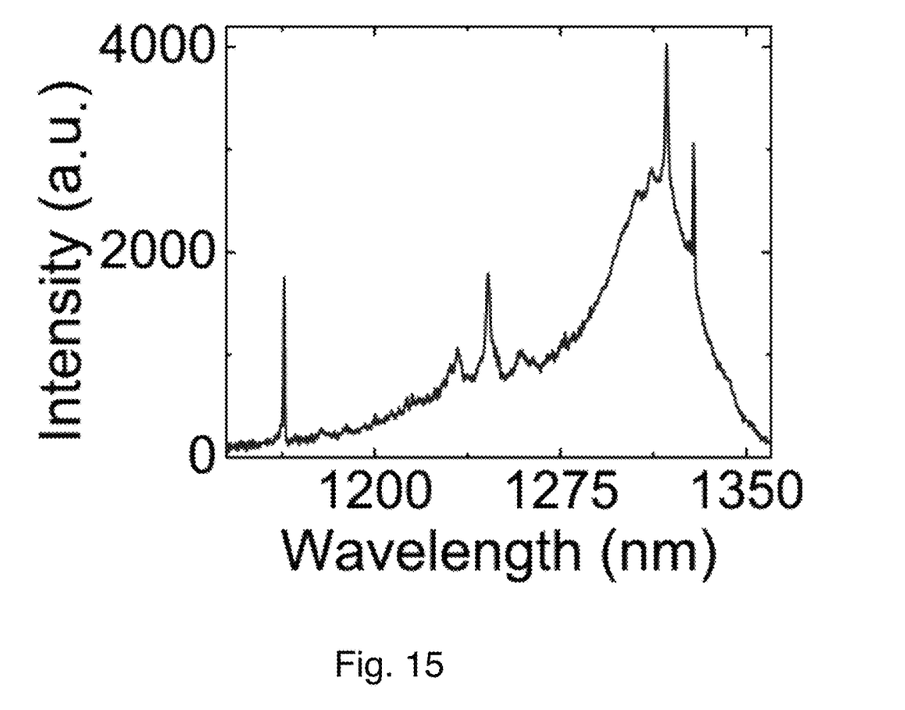
FIG. 15 shows fiber-coupled photoluminescence results.

As a final measurement of a fiberPC device, we demonstrate PL excitation and collection in an "all-fiber" package. In this setup, the LD pump at 830 nm is sent to a 2×2 directional coupler before transmitting to the same fiberPC as in section B5. Rather than collecting the PL externally with bulky free space optics, the cavity PL that is reradiated into the fiber is collected in the return direction from the appropriate port of the directional coupler. Though the directional coupler is not optimized for 1300 nm, we still obtain clear spectra due to a strong PL signal (FIG. 15). In this case the spectrum has a larger QD background component compared to the individual cavities because spatial filtering is not used and because the fiber core collects from a large area of uncoupled QDs. The fundamental modes of two unique cavities which physically overlap the fiber core are seen at 1317 nm and 1328 nm (the spectral difference is due to fabrication inhomogeneities). The cavities' alignment with the fiber core is likely to affect the intensity of collection. This measurement again proves that light can be coupled back and forth between PC cavities and a fiber in a monolithic package, which is far simpler and easier to use than a corresponding free space optical setup.

B7) CONCLUSIONS

In summary, we have demonstrated a technique to functionalize optical fiber tips with semiconductor photonic crystal cavities. Our simple epoxy-based transfer process preserves robust cavity properties and can be applied toward numerous materials and cavity designs. The fiberPC platform enables the exploration of useful fiber-coupled PC devices and widely extends the range of possibilities for practical devices. This design architecture provides a practical mechanically stable platform for the integration of photonic crystal cavities with macro scale optics and opens the door for innovative research on fiber-coupled cavity devices.

The invention claimed is:
1. A method of fabricating an optical apparatus, the method comprising:
providing an optical fiber having an exposed end face;
fabricating a device including at least one resonant optical structure in a semiconducting or dielectric material, wherein the at least one resonant optical structure is defined by a photonic crystal structure in the device, and wherein the device is fabricated on a substrate distinct from the optical fiber;
affixing the device to the exposed end face of the optical fiber such that the fiber and the at least one resonant optical structure are optically coupled and such that the photonic crystal structure is in physical contact with the exposed end face of the optical fiber;

wherein the fabricating a device comprises:

forming the photonic crystal structure in one or more material layers disposed on a substrate;

performing an undercut etch to separate the photonic crystal structure from the substrate such that the photonic crystal structure is suspended above the substrate by two or more lateral tabs;

wherein the affixing the device to the exposed end face of the optical fiber comprises:

depositing uncured adhesive on a transfer surface in a predetermined adhesive pattern;

touching the end face of the optical fiber to the adhesive pattern on the transfer surface such that the uncured adhesive is transferred to the end face of the fiber in the adhesive pattern to provide an adhesive-coated fiber end face;

aligning the adhesive-coated fiber end face to the photonic crystal structure suspended above the substrate;

making contact between the adhesive-coated fiber end face and the photonic crystal structure; and pulling the substrate and optical fiber apart such that the two or more lateral tabs break, thereby providing the device affixed to the end face of the fiber.

2. The method of claim 1, further comprising providing registration features disposed in a circular pattern around the device, wherein the circular pattern has the same diameter as the optical fiber.

3. The method of claim 1, wherein the adhesive pattern is configured such that adhesive does not come into contact with the one or more resonant optical structures.

4. The method of claim 1, wherein a core of the fiber and the one or more resonant optical structures have a spatial overlap.

5. The method of claim 1, wherein the one or more resonant optical structures are selected from the group consisting of: optical resonators, optical waveguides, and gratings.

* * * * *